(No Model.)
W. B. MAYES.
ROTARY STEAM ENGINE.
No. 387,093. Patented July 31, 1888.
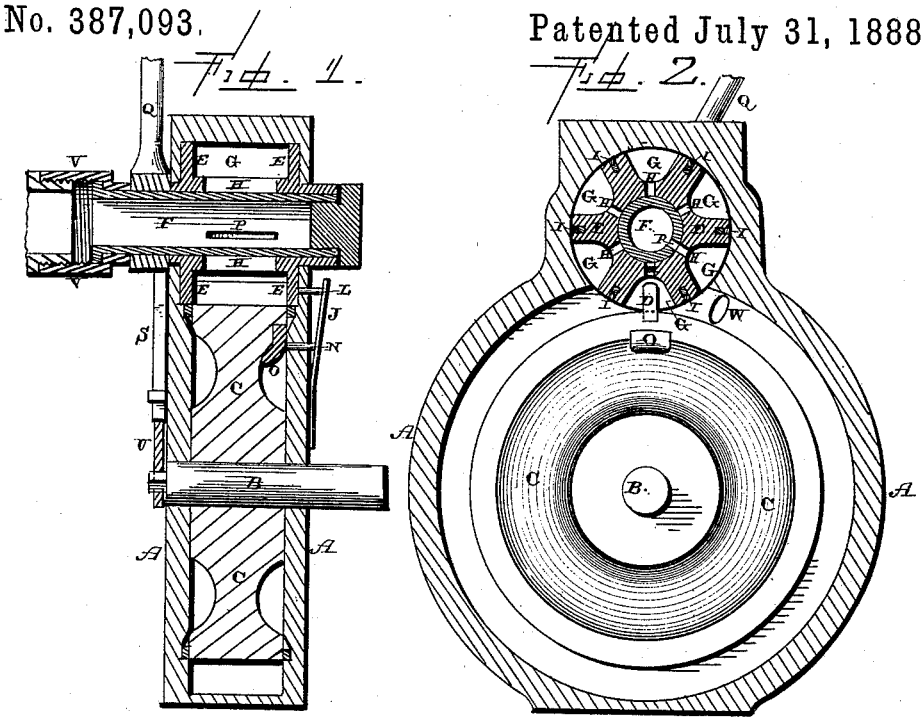
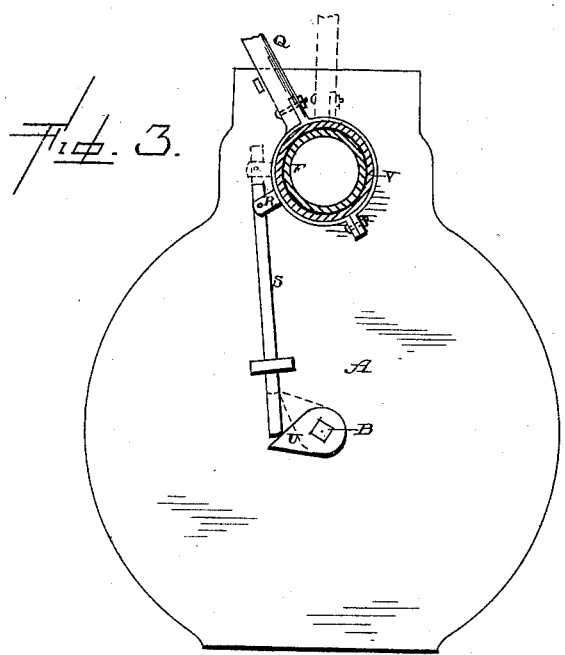
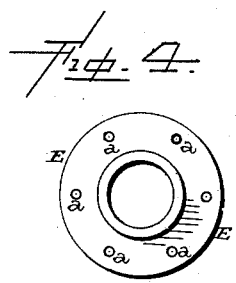
Witnesses.
L. T. Gardner
Edm. P. Ellis
Inventor.
W. B. Mayes.
per
F. A. Lehmann, atty

UNITED STATES PATENT OFFICE.

WILLIAM B. MAYES, OF McPHERSON, KANSAS.

ROTARY STEAM-ENGINE.

SPECIFICATION forming part of Letters Patent No. 387,093, dated July 31, 1888.

Application filed November 14, 1887. Serial No. 255,111. (No model.)

*To all whom it may concern:*

Be it known that I, WILLIAM B. MAYES, of McPherson, in the county of McPherson and State of Kansas, have invented certain new and useful Improvements in Rotary Steam-Engines; and I do hereby declare the following to be a full, clear, and exact description of the invention, such as will enable others skilled in the art to which it pertains to make and use it, reference being had to the accompanying drawings, which form part of this specification.

My invention relates to an improvement in rotary steam-engines; and it consists in, first, the combination of a suitable inclosing case or frame, a revolving piston, a rotating valve which is operated by the piston, a lock for holding the valve in position, and a projection or lug upon the piston for operating the lock; second, the combination of the inclosing-frame, a revolving piston, a rotating valve which is operated by the piston, and a perforated partially-revolving cylindrical cut-off which passes through the valve, and a mechanism connected to the journal and operated by a crank or cam connected to the piston, all of which will be more fully described hereinafter.

The objects of my invention are to use a revolving valve in connection with a cylindrical cut-off which passes through it, whereby the steam may be cut off after the piston has made three-quarters of its revolution, and the piston then driven the remainder of its revolution by expanded steam; to provide a lock for the rotating valve, whereby the valve is held in contact with the edge of the revolving piston, so as to prevent the passage of steam between them, and to produce a cheap, simple, and reliable rotary engine.

Figure 1 is a vertical section taken through the center of the engine. Fig. 2 is a vertical section through the valve and its journal or bearing, taken at right angles to Fig. 1. Fig. 3 is a side elevation of the engine, showing the mechanism for operating the cylindrical cut-off. Fig. 4 is a detail view.

A represents the inclosing-frame, B the driving-shaft, and C the rotary piston, provided with the vane D. In the upper portion of the frame is made a suitable recess, in which is placed the revolving valve E, which is placed upon the cylindrical cut-off F, which has a partially-rotating motion. This valve E is made tubular at its center, so as to fit snugly over the cylindrical cut-off F, and has a suitable number of recesses, G, in its side, and in which the vane D of the piston C catches for the purpose of moving the valve at each revolution of the piston, and has an opening, H, leading from each of the recesses G, which admit steam into the frame for the purpose of causing the piston to revolve. In the edges of this valve E, in between the recesses G, are made suitable recesses, in which are placed spring-actuated packings I, which serve to form a tight joint with the edge of the piston, and thus prevent steam from passing in between the edge of the valve and the piston, as would otherwise be the case. At each revolution of the piston the vane D catches in one of the recesses G, for the purpose of turning the valve partially around, and thus bringing a new opening G into position to receive the steam from the cut-off F.

As the friction of the piston against the edges of the valve E will be sufficient to keep the valve constantly turning, it is necessary that the valve should be locked in position after having been turned by the vane upon the piston, and for this purpose the spring-rod J is secured to the outer side of the frame, and which rod is provided with two studs or projections, L N, which extend through the side of the frame. The stud L catches in corresponding recesses, *a*, in the end of the valve E, while the stud N serves simply to operate the rod J and withdraw the stud L out of contact with the valve just in time to allow it to be partially revolved by the vane upon the piston. Secured to the piston C is a projection or cam, O, which strikes against the inner end of the stud N and forces the rod J outward, so that the stud L will release the valve. As soon as the cam or projection O passes by the stud N the two studs L N snap inwardly again and the stud L catches again in the recess in the end of the valve E, and thus locks it in position until the piston has had time to make another revolution.

The cylindrical cut-off F is made tubular in cross-section, and is provided with an opening, P, through which the steam passes to one of the openings G in the valve E. Secured to this cylindrical cut-off F is the operating-lever Q, by means of which the steam can be shut off and the engine instantly stopped at any moment without operating the valve in the steam-pipe. Projecting outward from this lever Q, which is rigidly secured to the cut-off F, is the arm R, to which the upper end of the operating-rod S is fastened. The lower end of this rod S extends downward through a suitable guide on the side of the frame A, and within easy reach of the cam or crank U on one end of the operating-shaft B. As the piston and shaft sweep around, this cam U strikes against the lower end of the rod S and forces the rod upward, thereby causing the cylindrical cut-off F to partially revolve after the piston has made about three-fourths of its revolution, and thus cut off the steam and cause the cylinder to make the remainder of its revolution by expanded steam alone.

The lever Q and the rod S are sufficiently heavy to cause the cylindrical cut-off F to partially revolve by their weight, and thus automatically return to position after having been moved by the cam U.

Upon the outer end of the cylindrical cut-off F is a swivel-connection, V, for making connection with the steam-pipe.

A steam-tight connection is made between the edges of the revolving piston C by means of suitable spring-actuated packing-rings, which are placed in suitable recesses made for them in the inner sides of the frame A. The exhaust escapes through the opening W in the side of the frame.

Having thus described my invention, I claim—

1. In a rotary engine, the combination of the inclosing-frame, the driving-shaft, and the rotary piston with a rotating valve which is operated entirely by the piston, and the cylindrical cut-off which extends through the valve, substantially as shown.

2. The combination of the inclosing-frame, the driving-shaft, and the piston with cylindrical cut-off provided with the opening P, the rotating valve provided with spaces for the vane upon the piston to catch in, and the openings H, for the admission of steam, with a spring-catch which locks the valve in position, substantially as described.

3. The combination of the inclosing-frame, the operating-shaft, and piston with the rotating valve which is operated by the piston, the cylindrical cut-off which extends through the valve, the lever, the operating-rod connected thereto, and the cam or crank connected to the piston, substantially as described.

4. The combination of the inclosing-frame, the piston provided with a cam or projection, O, the spring-rod J, provided with studs L N, the valve E, provided with recesses in its end for the stud L to catch in, and the cylindrical cut-off F, which passes through the valve, substantially as specified.

In testimony whereof I affix my signature in presence of two witnesses.

WILLIAM B. MAYES.

Witnesses:
W. M. ALLISON,
A. M. ALLISON.